US012323562B2

(12) United States Patent
Nakayoshi

(10) Patent No.: US 12,323,562 B2
(45) Date of Patent: Jun. 3, 2025

(54) ADJUST A POSITION OF AN IMAGE TO BE FORMED ON A SHEET BASED ON READING A CHART

(71) Applicant: CANON KABUSHIKI KAISHA, Tokyo (JP)

(72) Inventor: Asahiro Nakayoshi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 18/476,160

(22) Filed: Sep. 27, 2023

(65) Prior Publication Data
US 2024/0114095 A1 Apr. 4, 2024

(30) Foreign Application Priority Data
Sep. 29, 2022 (JP) ................... 2022-156132

(51) Int. Cl.
*H04N 1/00* (2006.01)
(52) U.S. Cl.
CPC ..... *H04N 1/00005* (2013.01); *H04N 1/00013* (2013.01); *H04N 1/00037* (2013.01); *H04N 1/00074* (2013.01); *H04N 1/00082* (2013.01)
(58) Field of Classification Search
None
See application file for complete search history.

(56) References Cited

U.S. PATENT DOCUMENTS

2021/0195051 A1* 6/2021 Takahashi ............ H04N 1/3878

FOREIGN PATENT DOCUMENTS

JP 2015029186 A 2/2015

\* cited by examiner

*Primary Examiner* — Eric A. Rust
(74) *Attorney, Agent, or Firm* — Canon U.S.A., Inc., IP Division

(57) ABSTRACT

An image forming apparatus includes an image forming circuit that forms a chart image on a first sheet, a reader that reads the formed chart image, and a controller. If an inclination amount of the first sheet is greater than a first amount and is less than a second amount greater than the first amount, the controller performs a rotation correction on the read image to reduce the inclination amount, and stores an image of a first sheet area in the image after the correction, in a memory. If the inclination amount is less than the first amount, the controller stores an image of a predetermined area including the first sheet area, in the memory without the correction. The image forming circuit forms an image on a second sheet so as to reduce a difference in position between the stored image and an image used to form the chart image.

3 Claims, 11 Drawing Sheets

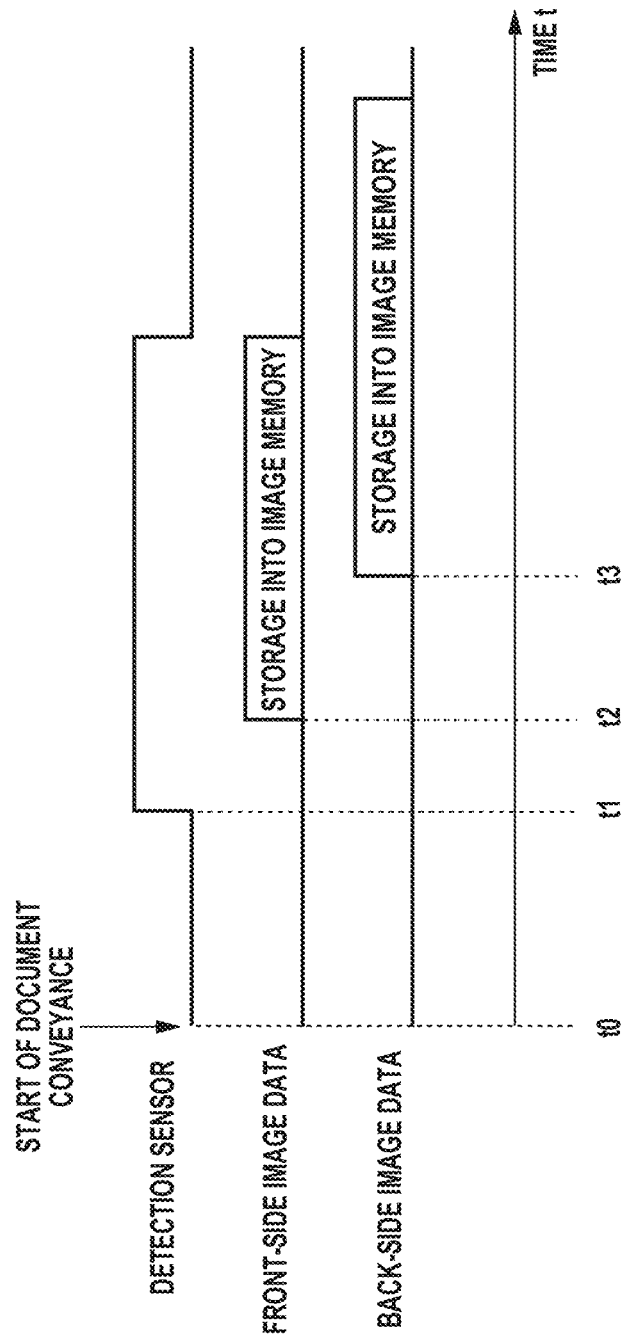

ADJUST A POSITION OF AN IMAGE TO BE FORMED ON A SHEET BASED ON READING A CHART

BACKGROUND

Technical Field

One disclosed aspect of the embodiments relates to an image forming apparatus including an image reader that reads a chart image used to adjust a position of an image to be formed on a sheet.

Description of the Related Art

Conventionally, there is known a technique in which a chart image formed on a recording medium by an image forming apparatus is read by an image reader, and a position of an image to be formed on a recording medium is adjusted based on a result of the reading. Japanese Patent Application Laid-Open No. 2015-29186 discusses a configuration in which a chart image formed on a recording medium by an image forming apparatus is read while the recording medium is conveyed by a document feeder provided on an upper part of the image forming apparatus. According to the configuration discussed in Japanese Patent Application Laid-Open No. 2015-29186, trimming processing is performed on an image obtained by reading the chart image so that the trimmed image includes an edge portion of a document, thereby creating image data that includes a part of a document image and a part of an out-of-document image. Such a configuration enables the trimmed image to include corners of the document, for example, even in a case where the document is read in an inclined state as illustrated in FIG. 11.

Conventionally, there is also known a configuration in which a shadow of a leading edge of a document in a conveyance direction is detected from image data representing a reading result, and a rotation correction is performed on the image data based on an inclination angle of the detected shadow of the leading edge of the document relative to a main scanning direction as discussed in United States Patent Application Publication No. 20170126929.

According to the configuration discussed in Japanese Patent Application Laid-Open No. 2015-29186, a blank part other than the document image is included in the trimmed image, which increases a required capacity of an image memory storing the image data.

In a case where the rotation correction discussed in United States Patent Application Publication No. 20170126929 is performed on the read chart image, the following issues may occur. More specifically, for example, when the rotation correction is performed on the read chart image, an image output after the rotation correction may be coarse. The image after the rotation correction becomes coarser as a rotation angle in the rotation correction increases. As a result, adjustment accuracy of the position of the image to be formed on the recording medium may be lowered.

SUMMARY

The disclosure is directed to a technique for preventing the adjustment accuracy of the position of the image to be formed on a sheet from being lowered while suppressing an increase in capacity of the memory storing the image data.

According to an aspect of the embodiments, an image forming apparatus includes an image forming circuit, a reader, and a controller. The image forming circuit is configured to form, on a first sheet, a chart image used to adjust a position of an image. The reader is configured to read the chart image on the first sheet while the first sheet is conveyed. The controller is configured to determine, based on an image obtained by the reader reading the chart image, an inclination amount corresponding to an inclination angle of a leading edge of the first sheet in a conveyance direction in which the first sheet is conveyed, relative to a predetermined direction orthogonal to the conveyance direction. In a case where the inclination amount is greater than a first predetermined amount and is less than a second predetermined amount greater than the first predetermined amount, the controller is configured to perform a rotation correction on the image obtained by the reader to reduce the inclination amount, and cut out and store an image of an area of the first sheet in the image subjected to the rotation correction in a memory. In a case where the inclination amount is less than the first predetermined amount, the controller is configured to cut out and store an image of a predetermined area including the area of the first sheet in the image obtained by the reader, in the memory without performing the rotation correction. The predetermined area has a size smallest among standard sizes including the area of the first sheet. The image forming circuit forms an image on a second sheet so as to reduce a difference in position between the image stored in the memory and an image used to form the chart image on the first sheet.

Further features of the disclosure will become apparent from the following description of exemplary embodiments with reference to the attached drawings.

BRIEF DESCRIPTION OF THE DRAWINGS

FIG. 3 is a diagram illustrating acquisition timings of image data to be stored in an image memory according to the exemplary embodiment.

DESCRIPTION OF THE EMBODIMENTS

An exemplary embodiment of the disclosure will be described below with reference to the drawings. Shapes, relative arrangements, and the like of components described in the exemplary embodiment can be changed as appropriate based on a configuration of an apparatus to which the exemplary embodiment is applied and various conditions, and the scope of the disclosure is not intended to be limited to the following exemplary embodiment. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

[Image Forming Apparatus]

Figure 1:
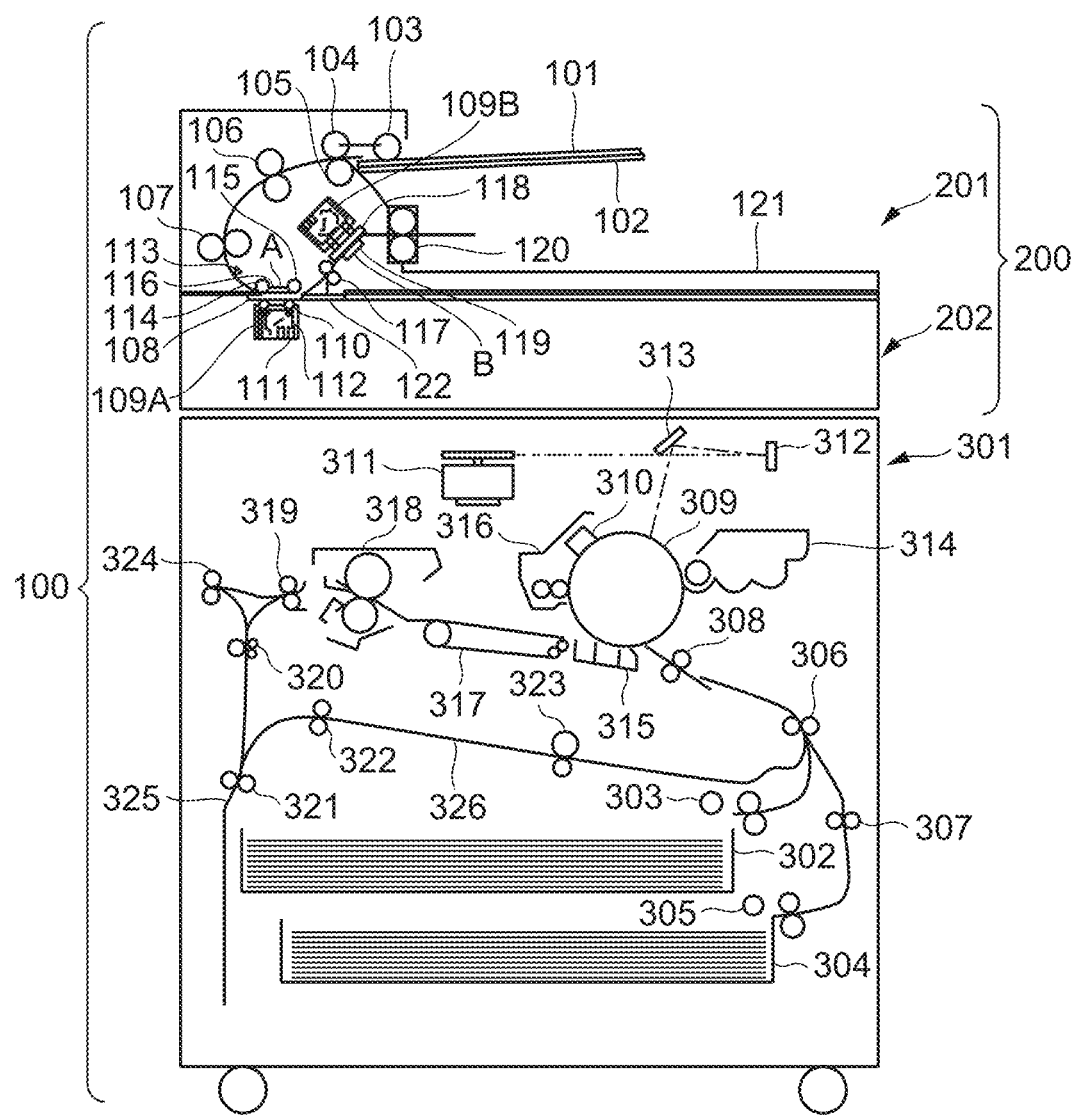
FIG. 1 is a diagram illustrating a configuration of an image forming apparatus according to an exemplary embodiment.

FIG. 1 is a cross-sectional diagram illustrating a configuration of a monochrome electrophotographic copier (hereinafter referred to as an image forming apparatus) 100 used in the present exemplary embodiment. The image forming apparatus 100 is not limited to the copier, and may be, for example, a facsimile apparatus, a printing machine, or a printer. A recording method used by the image forming apparatus 100 is also not limited to the electrophotographic method, and may be, for example, an inkjet method. The image forming apparatus 100 may be of either a monochrome type or a color type.

The configuration and functions of the image forming apparatus 100 will be described next with reference to FIG. 1. As illustrated in FIG. 1, the image forming apparatus 100 includes an image reader 200 including a document feeder 201 and a reader 202, and an image printer 301. The document feeder 201 is pivotable relative to the reader 202.

<Image Reader>

A pickup roller 103 serving as a feeding unit feeds a document 101 stacked on a tray 102 serving as a stacking portion, to an inside of the document feeder 201. Separation rollers 104 and 105 are provided to prevent a plurality of sheets of the document 101 from being fed at a time by the pickup roller 103. The document 101 fed to a conveyance path is conveyed toward a reading position A by conveyance rollers 106 and read rollers 107. The separation rollers 104 and 105, the conveyance rollers 106, and the read rollers 107 are included in a conveyance unit.

A transparent glass 108 is disposed at the reading position A, and a reading unit or circuit 109A is provided on a side of the transparent glass 108 opposite to a side of the transparent glass 108 on which the conveyance path is provided. The reading unit 109A includes a light-emitting diode (LED) 110, an image sensor 111, and an optical component group 112. The image sensor 111 includes, in a main scanning direction, a plurality of pixels configured to receive light of red (R), green (G), and blue (B).

The reading unit 109A reads an image on a front side (a first side) of the document 101 in the following manner.

More specifically, the LED 110 serving as a light source applies (emits) light to the front side of the document 101 through the transparent glass 108. The optical component group 112 guides reflected light from the document 101 received through the transparent glass 108, to the image sensor 111. The image sensor 111 outputs analog image data based on the received reflected light. The image sensor 111 reads an image corresponding to one line extending in the main scanning direction at a time. Thus, the image sensor 111 can output image data including the entire document 101 by reading the image corresponding to one line a plurality of times while the document 101 is conveyed. An analog-to-digital (A/D) conversion unit (not illustrated) in the reading unit 109A converts the analog image data into digital image data, and outputs the digital image data to a controller 213 (see FIG. 2).

On an upstream side of the reading position A in a conveyance direction of the document 101, a detection sensor 113 for detecting the document 101 is provided. The controller 213 determines timing for the reading unit 109A to start reading the document 101, based on timing when the detection sensor 113 has detected the document 101.

Pressing rollers 114 and 115 press the document 101 against the transparent glass 108. At a position facing the reading unit 109A between the pressing rollers 114 and 115, namely, at a position opposite to the reading unit 109A across the conveyance path where the document 101 is conveyed, a white guide plate 116 as an opposing member is disposed.

The document 101 having passed the reading position A is conveyed toward a reading position B by conveyance rollers 117. A transparent glass 118 is disposed at the reading position B, and a reading unit or circuit 109B is provided on a side of the transparent glass 118 opposite to a side of the transparent glass 118 on which the conveyance path is provided. The reading unit 109B has a configuration similar to the configuration of the reading unit 109A, and reads an image on a back side (a second side) of the document 101. Timing for the reading unit 109B to start reading the document 101 is also determined based on the timing when the detection sensor 113 has detected the document 101. A white guide plate 119 is disposed at a position facing the reading unit 109B.

The document 101 having passed the reading position B is discharged to a discharge tray 121 by discharge rollers 120.

A white reference plate 122 serving as a reference reading member in shading data acquisition is provided on a right side of the transparent glass 108.

<Image Printer>

Sheet storage trays 302 and 304 are provided inside the image printer 301.

The sheet storage trays 302 and 304 can store different types of recording media. For example, A4-size plain paper is stored in the sheet storage tray 302, and A4-size cardboard is stored in the sheet storage tray 304. The recording media is media on which images are to be formed by the image forming apparatus 100, and for example, a paper sheet, a resin sheet, a cloth, an overhead projector (OHP) sheet, and a label are included in the recording media.

The recording medium stored in the sheet storage tray 302 is fed by a pickup roller 303, and is conveyed to registration rollers 308 by conveyance rollers 306. The recording medium stored in the sheet storage tray 304 is fed by a pickup roller 305, and is conveyed to the registration rollers 308 by conveyance rollers 307 and the conveyance rollers 306.

Image data output from the image reader 200 is input to an optical scanner 311 including a semiconductor laser and a polygonal mirror. An outer peripheral surface of a photosensitive drum 309 is charged by a charger 310 in a charging unit 316. After the outer peripheral surface of the photosensitive drum 309 is charged, a laser beam corresponding to the image data (the image signal) input from the image reader 200 to the optical scanner 311 is applied from the optical scanner 311 to the outer peripheral surface of the photosensitive drum 309 through the polygonal minor and mirrors 312 and 313. As a result, an electrostatic latent image is formed on the outer peripheral surface of the photosensitive drum 309.

Subsequently, the electrostatic latent image is developed with toner by a developing unit 314 included in an image forming unit or circuit, so that a toner image is formed on the outer peripheral surface of the photosensitive drum 309. The toner image formed on the photosensitive drum 309 is transferred to the recording medium by a transfer charger 315 provided at a position (a transfer position) facing the photosensitive drum 309. The registration rollers 308 convey the recording medium to the transfer position in synchronization with transfer timing for the transfer charger 315 to transfer the toner image to the recording medium. As described below, the registration rollers 308 adjust timing for conveying the recording medium to the transfer position, based on a result of reading an adjustment chart 500 (see FIG. 7A) by the image reader 200.

The recording medium to which the toner image has been transferred in the above-described manner is conveyed to a fixing unit or circuit 318 by a conveyance belt 317, and is heated and pressurized by the fixing unit 318. As a result, the toner image is fixed to the recording medium. In this manner, image formation is performed on the recording medium by the image forming apparatus 100.

In a case where image formation is performed in a simplex print mode, the recording medium having passed through the fixing unit 318 is discharged to a discharge tray (not illustrated) by discharge rollers 319 and 324. In a case where image formation is performed in a duplex print mode, after fixing processing is performed on the first side of the recording medium by the fixing unit 318, the recording medium is conveyed to an inversion path 325 by the discharge rollers 319, conveyance rollers 320, and inversion rollers 321. The recording medium is then conveyed to the registration rollers 308 again via a duplex conveyance path 326 by conveyance rollers 322 and 323, so that an image is formed on the second side of the recording medium using the above-described method. The recording medium is then discharged to the discharge tray (not illustrated) by the discharge rollers 319 and 324.

In a case where the recording medium on which the image has been formed on the first side is discharged in a face-down state to an outside of the image forming apparatus 100, the recording medium having passed through the fixing unit 318 is conveyed in a direction toward the conveyance rollers 320 through the discharge rollers 319. Thereafter, the conveyance rollers 320 are inversely rotated immediately before a trailing edge of the recording medium passes through a nip portion of the conveyance rollers 320, whereby the recording medium is discharged to the outside of the image forming apparatus 100 through the discharge rollers 324 in a state where the first side of the recording medium faces downward.

The above is the description of the configuration and the functions of the image forming apparatus 100.

<Control Configuration>

Figure 2:
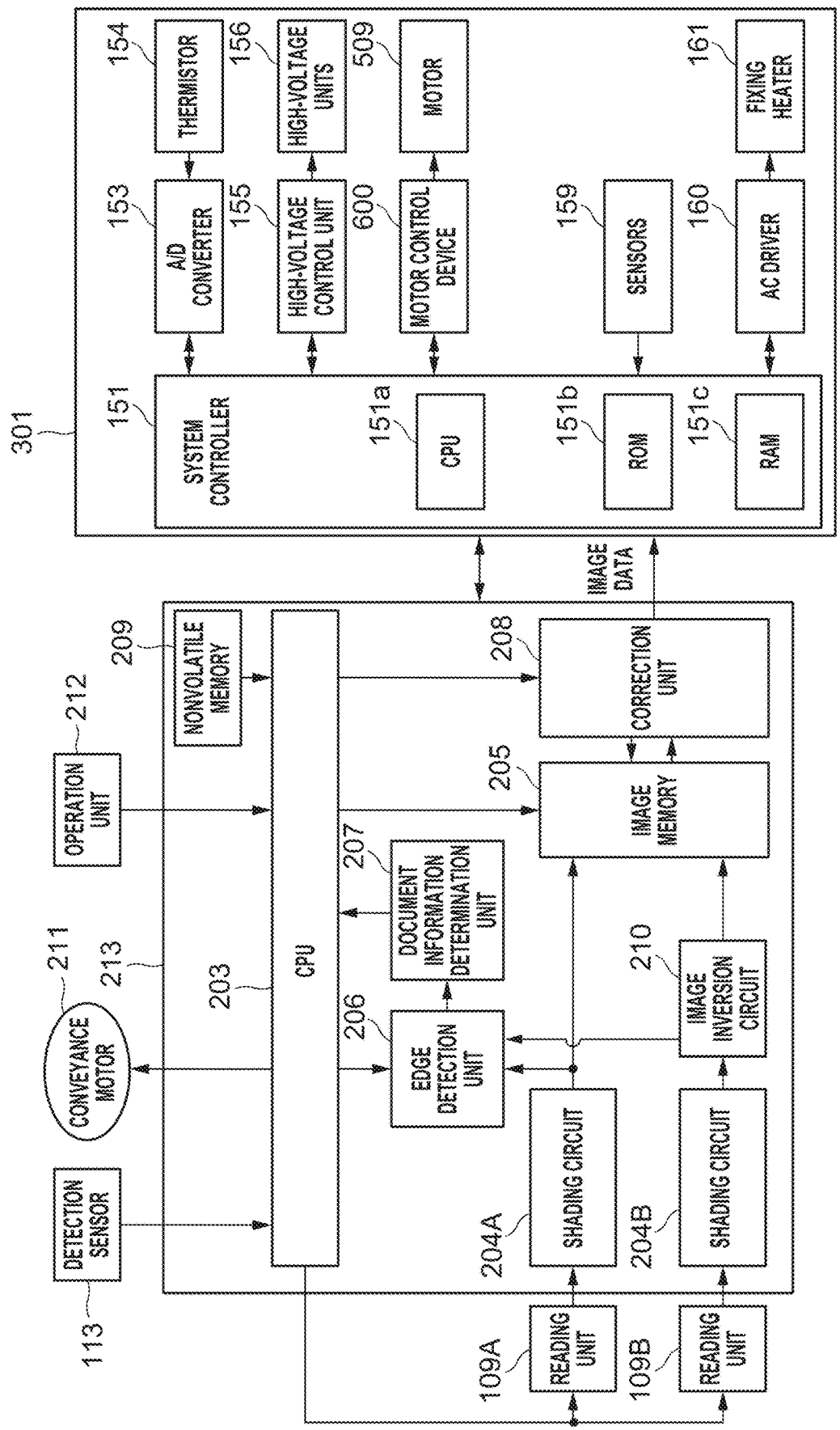
FIG. 2 is a block diagram illustrating a control configuration of the image forming apparatus according to the exemplary embodiment.

FIG. 2 is a block diagram illustrating an example of a control configuration of the image forming apparatus 100. Various functions to be described below are implemented by at least one application specific integrated circuit (ASIC).

As illustrated in FIG. 2, a system controller 151 includes a central processing unit (CPU) 151a, a read only memory (ROM) 151b, and a random access memory (RAM) 151c. The system controller 151 is connected to an analog-to-digital (A/D) converter 153, a high-voltage control unit or circuit 155, a motor control device 600, sensors 159, and an alternating-current (AC) driver 160. The system controller 151 can transmit and receive data and commands to and from each of the units connected thereto.

The CPU 151a performs various sequences relating to a predetermined image formation sequence by reading out and executing various programs stored in the ROM 151b.

The RAM 151c is a storage device. The RAM 151c stores various kinds of data such as setting values for the high-voltage control unit 155 and command values for the motor control device 600.

The system controller 151 receives signals from the sensors 159, and sets the setting values for the high-voltage control unit 155 based on the received signals.

The high-voltage control unit 155 supplies appropriate voltages to high-voltage units 156 (e.g., the charger 310, the developing unit 314, and the transfer charger 315) based on the setting values set by the system controller 151.

The motor control device 600 controls a motor 509 for driving a load provided in the image printer 301, in response to a command output from the CPU 151a.

The A/D converter 153 receives a signal detected by a thermistor 154 that detects a temperature of a fixing heater 161, converts the detected signal from an analog signal into a digital signal, and transmits the digital signal to the system controller 151. The system controller 151 controls the AC driver 160 based on the digital signal received from the A/D converter 153. The AC driver 160 controls the fixing heater 161 so that the temperature of the fixing heater 161 becomes an appropriate temperature for the fixing processing. The fixing heater 161 is a heater used for the fixing processing and is included in the fixing unit 318.

In the above-described manner, the system controller 151 controls an operation sequence of the image forming apparatus 100.

Next, a control configuration of the image reader 200 will be described. A CPU 203 controls the image reader 200 by executing programs stored in a nonvolatile memory 209.

A conveyance motor 211 is a driving source for the rollers provided in the document feeder 201, and is rotationally driven under control of the controller 213.

An operation unit or circuit 212 provides a user interface. The CPU 203 controls the operation unit 212 to display an operation screen on which the user can set information such as the type of recording medium to be used (hereinafter referred to as a sheet type), on a display provided in the operation unit 212. The CPU 203 receives the information set by the user from the operation unit 212, and outputs the information set by the user to the system controller 151.

The system controller 151 transmits information indicating the state of the image forming apparatus 100 to the operation unit 212. The information indicating the state of the image forming apparatus 100 is information about, for example, the number of sheets on which images are to be formed, a progress status of an image forming operation, and jamming and double feeding of sheets in the image printer 301 and the document feeder 201. The operation unit 212 displays, on the display, the information received from the system controller 151.

The reading units or circuits 109A and 109B output digital image data to the controller 213. The image data has a higher numerical value as intensity of the reflected light increases. The level of this numerical value is hereinafter referred to as a luminance level. Further, in the following, the image data output from the reading unit 109A is referred to as front-side image data, and the image data output from the reading unit 109B is referred to as back-side image data.

The front-side image data output from the reading unit 109A is input to a shading circuit 204A, and the back-side image data output from the reading unit 109B is input to a shading circuit 204B.

Each of the shading circuits 204A and 204B corrects non-uniformity of a light quantity of the LED 110 and influence of sensitivity unevenness among pixels of the image sensor 111 (which is referred to as a shading correction) by performing addition or subtraction processing or multiplication or division processing on the image data, thereby generating image data uniform in the main scanning direction.

The front-side image data after the shading correction by the shading circuit 204A is stored in an image memory 205. The back-side image data after the shading correction by the shading circuit 204B is input to an image inversion circuit 210.

The image inversion circuit 210 inverts the back-side image data in the main scanning direction. This is because, in the present exemplary embodiment, the reading units 109A and 109B have configurations similar to each other, and an image read by the reading unit 109B is inverted in the main scanning direction relative to an image read by the reading unit 109A. The back-side image data after the processing by the image inversion circuit 210 is stored in the image memory 205. In other words, the image memory 205 functions as a first storage unit or circuit.

FIG. 3 is a diagram illustrating acquisition timings of the front-side image data and the back-side image data to be stored in the image memory 205. After conveyance of the document 101 is started at a time t0, the detection sensor 113 detects a leading edge of the document 101 at time t1. The CPU 203 determines a time t2 before the document 101 reaches the reading position A, based on the time t1 and, for example, a conveyance speed of the document 101. The CPU 203 then stores the front-side image data output from the reading unit 109A into the image memory 205 for a predetermined period from the time t2. The predetermined period is a period until at least the trailing edge of the document 101 passes the reading position A. The predetermined period is determined based on the conveyance speed of the document 101. Likewise, the CPU 203 determines a time t3 before the document 101 reaches the reading position B, based on the time t1. The CPU 203 then stores the back-side image data output from the reading unit 109B into the image memory 205 for the predetermined period from the time t3. The CPU 203 may start the reading by the reading unit 109A and store the front-side image data into the image memory 205 at the time t2, or may start the reading by the reading unit 109A at a time before the time t2 and store the front-side image data into the image memory 205 at the time t2. The CPU 203 may start the reading by the reading unit 109B and store the back-side image data into the image memory 205 at the time t3, or may start the reading by the reading unit 109B at a time before time t3 and store the back-side image data into the image memory 205 at the time t3. In the following description, an image represented by the front-side image data is also referred to as a front-side image, and an image represented by the back-side image data is also referred to as a back-side image.

As illustrated in FIG. 2, the front-side image data output from the shading circuit 204A is also input to an edge detection unit or circuit 206. The back-side image data output from the image inversion circuit 210 is also input to the edge detection unit 206. In the following, correction of the front-side image data will be described, but the back-side image data is corrected in a similar manner.

[Rotation Correction of Image in First Reading Mode]

Rotation correction of the front-side image and the back-side image in a first reading mode according to the present exemplary embodiment will be described next. The first reading mode is a reading mode used to, for example, when a copy operation of forming an image on the recording medium based on a read document image or a scan operation of transmitting the read document image to an external apparatus such as a personal computer (PC) is performed.

Figure 4A:
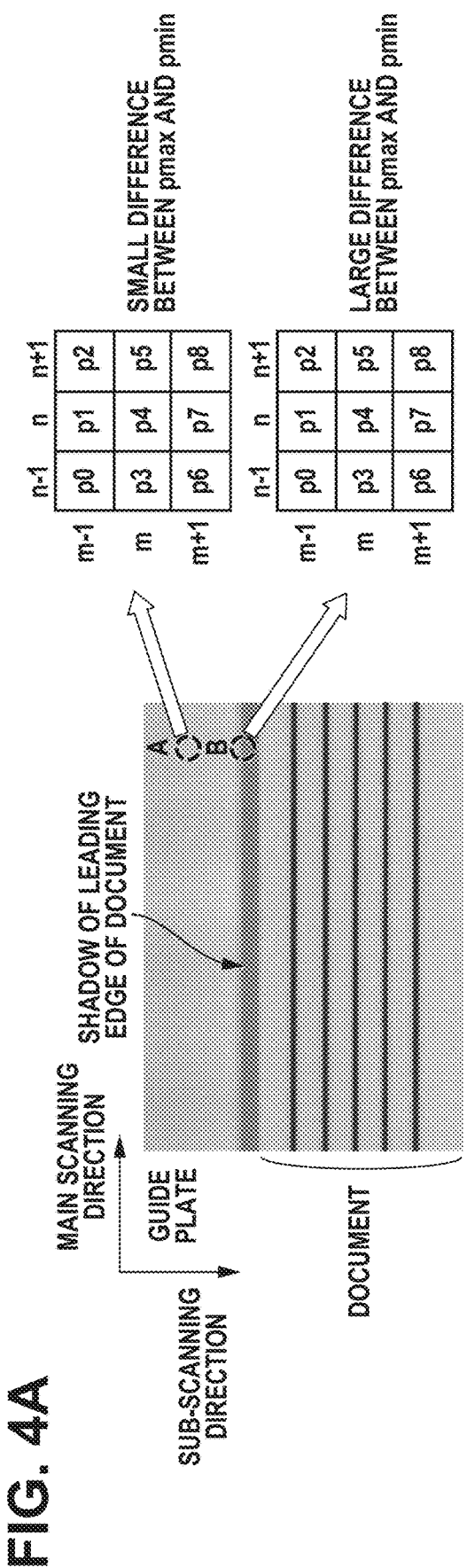
FIGS. 4A and 4B are diagrams illustrating processing by an edge detection unit according to the exemplary embodiment.
Figure 4B:
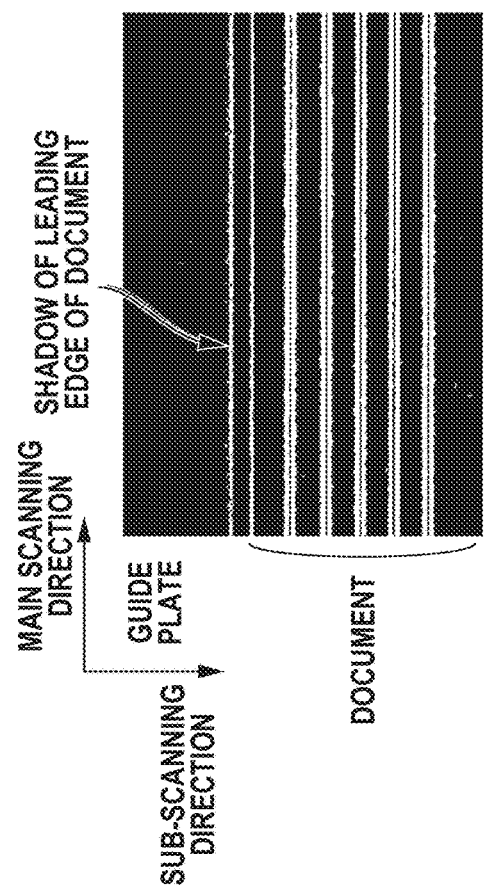

FIGS. 4A and 4B are diagrams illustrating processing by the edge detection unit 206. FIGS. 4A and 4B each illustrate an image in which pixel lines in the main scanning direction obtained by the reading unit 109A at predetermined intervals from the time t2 are combined in a sub-scanning direction orthogonal to the main scanning direction. As described above, the front-side image data input to the edge detection unit 206 is the data obtained starting from the time t2 before the leading edge of the document 101 in the conveyance direction reaches the reading position A. More specifically, when the reading by the reading unit 109A is started, the white guide plate 116 is read first. The image of the document 101 is then read while the document 101 is conveyed. In other words, the front-side image data input to the edge detection unit 206 includes image data representing the white guide plate 116 and image data representing the leading edge of the document 101.

The edge detection unit 206 performs binarization processing on the front-side image data while setting an area of a total of nine pixels including three pixels in the main scanning direction and three pixels in the sub-scanning direction, as one block. In the following, the number of pixels of each of the reading units 109A and 109B in the main scanning direction is N (where N is a positive integer, e.g., 7488), and each of the reading units 109A and 109B performs the reading M (where M is a positive integer, e.g., 12000) times during the above-described predetermined period. A pixel position in the main scanning direction is denoted by n (0≤n≤N−1), and a pixel position in the sub-scanning direction is denoted by m (0≤m≤M−1). Luminance values of the nine pixels in one block are denoted by px (x=0 to P where P is a positive integer, e.g., 8), and the maximum value and the minimum value of the luminance values are denoted by pmax and pmin.

At a position where all of the nine pixels correspond to the white guide plate 116 like a point A in FIG. 4A, all of the nine pixels are white pixels. Thus, a difference between the maximum value pmax and the minimum value pmin is small. On a boundary between the white guide plate 116 and a shadow (in gray) of the leading edge of the document 101 like a point B in FIG. 4A, white pixels and gray pixels are included in the nine pixels. Thus, the difference between the maximum value pmax and the minimum value pmin is larger. Accordingly, in a case where the difference between the maximum value pmax and the minimum value pmin is greater than a predetermined threshold pth, it can be determined that the block includes a pixel that is a candidate of the shadow caused by the leading edge of the document 101 (hereinafter referred to as a candidate pixel). In the present exemplary embodiment, when the difference between the maximum value pmax and the minimum value pmin in a block is greater than the predetermined threshold pth, a center pixel (a pixel at coordinates (n, m)) of the block is determined to be the candidate pixel. The edge detection unit 206 performs this determination processing on each pixel position n and each pixel position m except for n=0, n=N−1, m=0, and m=M−1. In the present exemplary embodiment, one scale in each of an x axis and a y axis corresponds to a distance between center positions of two adjacent pixels.

FIG. 4A illustrates an image represented by image data of K bits (with a luminance level of 0 to $2^K-1$), and FIG. 4B illustrates an image represented by image data obtained by binarizing the image data of the image illustrated in FIG. 4A, based on the predetermined threshold pth of 14. White portions in FIG. 4B indicate pixels determined to be the candidates of the shadow caused by the leading edge of the document 101 by the above-described processing. Among the plurality of candidate pixels illustrated in FIG. 4B, a line of the candidate pixels in the main scanning direction positioned closest to the leading edge side in the sub-scanning direction (i.e., a pixel line in the main scanning direction that is first determined to be the candidate pixels in the sub-scanning direction) is determined to be the shadow caused by the leading edge of the document 101.

Figure 5:
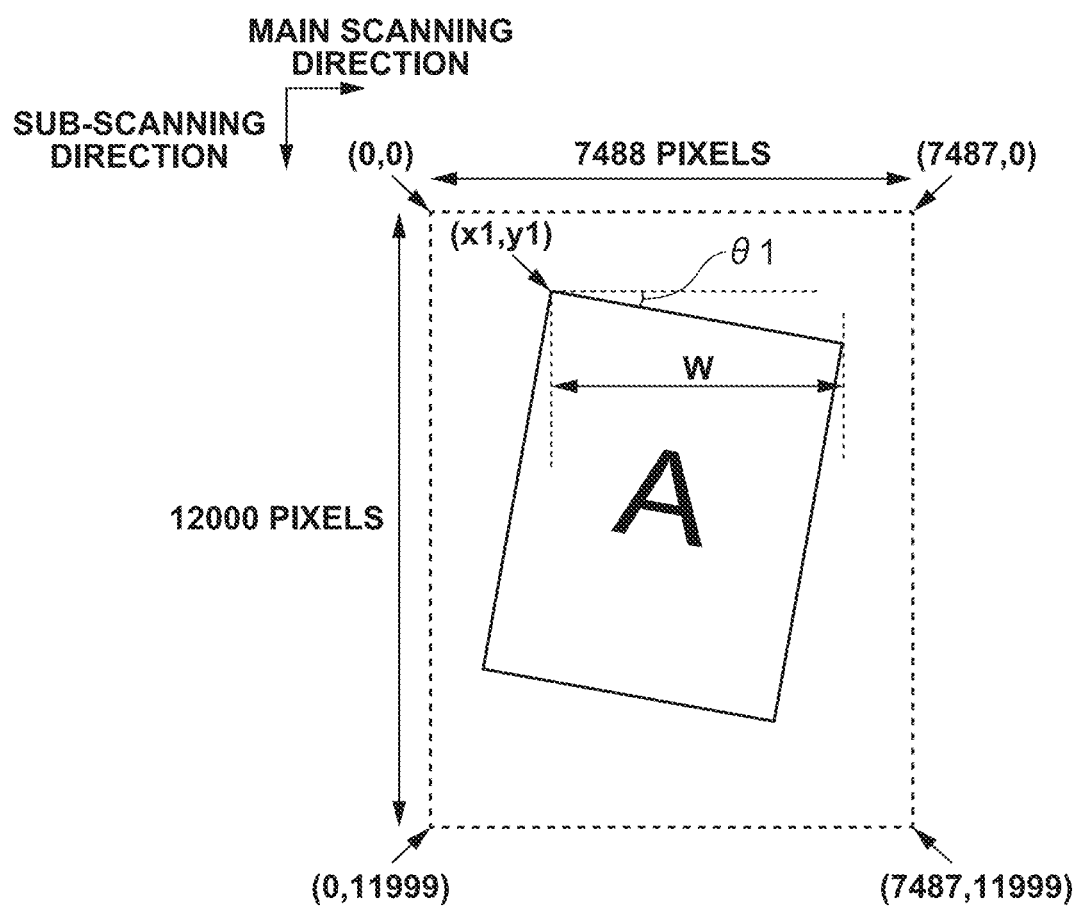
FIG. 5 is a diagram illustrating an image represented by binary data input to a document information determination unit according to the exemplary embodiment.

FIG. 5 illustrates an image represented by binary data input to a document information determination unit 207. The image represented by the binary data input to the document information determination unit 207 is an image within a range indicated by a dashed line in FIG. 5, and encompasses the document 101. The range indicated by the dashed line corresponds to the pixel positions n from 0 to N−1 and the pixel positions m from 0 to M−1

The document information determination unit 207 determines a distance (a width) W between two corners of the leading edge of the document 101 in the main scanning direction. The document information determination unit 207 then outputs front-side document information including the width W to the CPU 203. The front-side document information also includes a position and an angle of the document 101 in the front-side image. The position of the document 101 is a position (x1, y1) corresponding to a first position of the document 101 in the front-side image. In the present exemplary embodiment, one (on the left side in FIG. 5) of the two corners of the leading edge of the shadow caused by the document 101 is set as the first position. The angle of the document 101 is an angle of a predetermined edge of the document 101 in the front-side image, relative to a reference direction of the front-side image. In the present exemplary embodiment, the shadow caused by the leading edge of the document 101 is set as the predetermined edge, and the main scanning direction (the predetermined direction) is set as the reference direction. In other words, the angle of the document 101 is θ1 in FIG. 5. In a case where the shadow caused by the leading edge of the document 101 is inclined on an upstream side of the position (x1, y1) in the conveyance direction, the angle θ1 has a negative value. In a case where the shadow caused by the leading edge of the document 101 is inclined on a downstream side of the position (x1, y1), the angle θ1 has a positive value.

The CPU 203 outputs, as the front-side document information, the position (x1, y1), the width W, and the angle θ1 to a correction unit 208.

The correction unit 208 reads out the front-side image data stored in the image memory 205 based on the position (x1, y1), the width W, and the angle θ1, and outputs the front-side image data to the system controller 151. More specifically, the correction unit 208 reads out the image data along a direction parallel to the shadow caused by the leading edge of the document 101 with the position (x1, y1) as a starting point.

The correction unit 208 reads out the front-side image data stored in the image memory 205, covering the trailing-edge of the document 101 in the above-described manner. In other words, the correction unit 208 functions as a readout unit.

Figure 6:
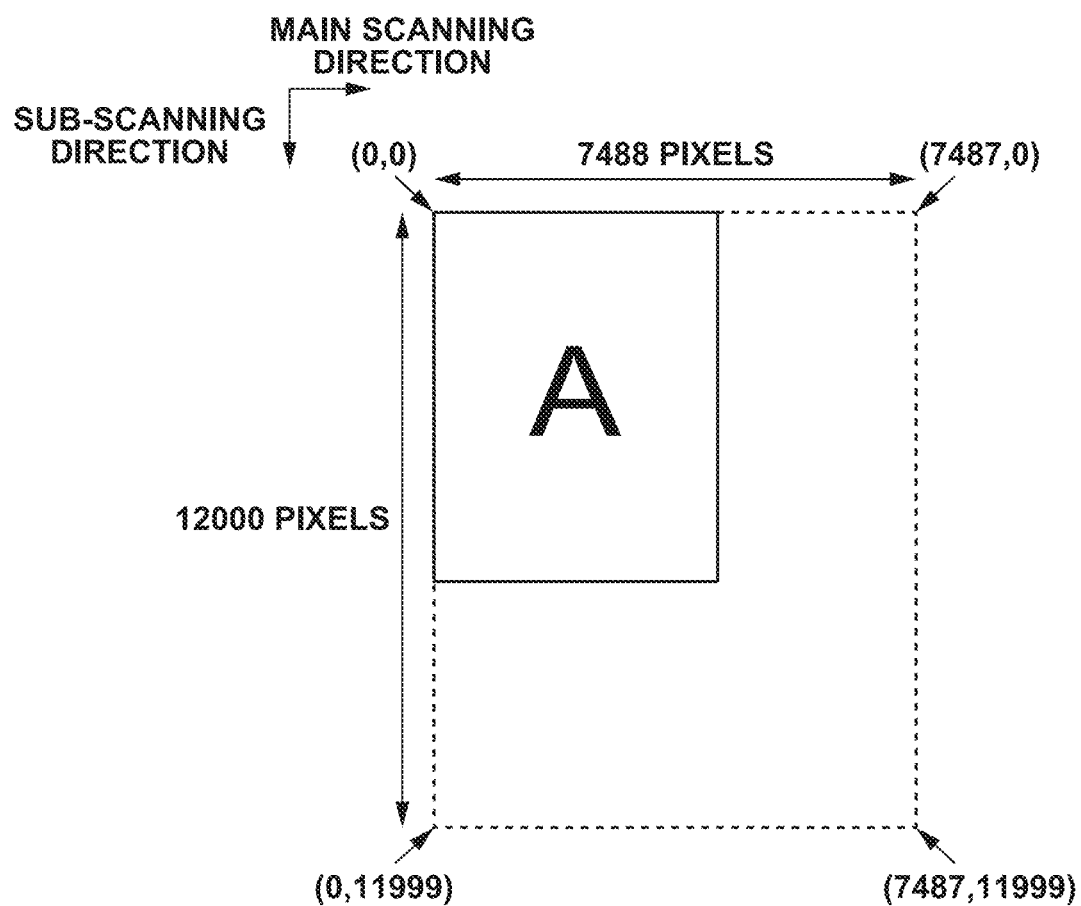
FIG. 6 is a diagram illustrating an image read out by a correction unit according to the exemplary embodiment.

FIG. 6 is a diagram illustrating the image read out by the correction unit 208. As illustrated in FIG. 6, the image data is read out in an amount corresponding to the width W along the direction parallel to the shadow, whereby the leading edge of the document 101 is made parallel to the main scanning direction. Similar processing is performed on the back-side image data.

The system controller 151 cuts out an image area to be printed, from the image data output from the correction unit 208. For example, the system controller 151 trims the image data with the position (0, 0) of the image data output from the correction unit 208 in FIG. 6 as a reference position, based on the size of the recording medium set by the user through the operation unit 212. More specifically, for example, in a case where the size of the document 101 illustrated in FIG. 6 is A4, and the size of the recording medium set by the user through the operation unit 212 is A4, the system controller 151 can cut out the image of the document 101 in which the shadow of the right edge of the document 101 and the shadow of the trailing edge of the document 101 are removed. The system controller 151 controls the image printer 301 to perform printing based on the trimmed image data. In other words, the system controller 151 can function as an external apparatus. Examples of the external device include, in addition to the system controller 151 provided in the image forming apparatus 100, a smartphone, a tablet, and a PC.

<Adjustment of Position of Image to be Formed on Recording Medium>

[Adjustment Chart]

In the present exemplary embodiment, when an instruction to output the adjustment chart 500, which is used to adjust the position of the image to be formed on the recording medium, is issued through the operation unit 212, the system controller 151 controls the image printer 301 to form the adjustment chart 500 on the recording medium. The system controller 151 also displays, on the display of the operation unit 212, a notification prompting the user to place, on the tray 102 of the document feeder 201, the recording medium on which the adjustment chart 500 is formed. When the user inputs a reading start instruction through the operation unit 212 after placing, on the tray 102, the recording medium on which the adjustment chart 500 is formed, the reading is started.

Figure 7A:
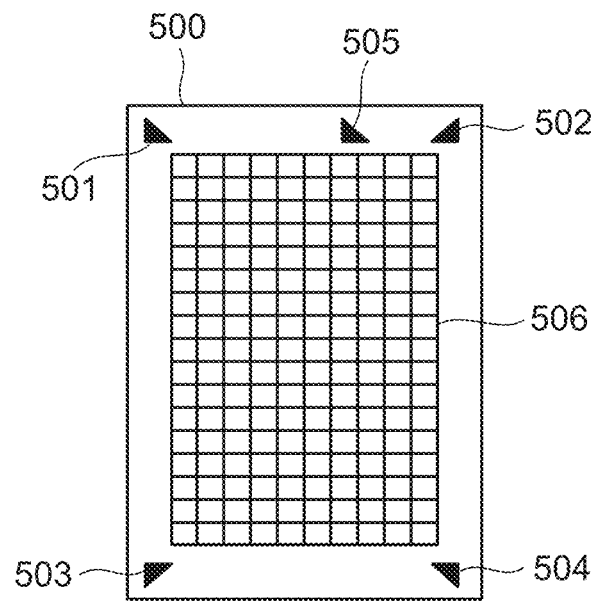
FIGS. 7A and 7B are diagrams illustrating an adjustment chart according to the exemplary embodiment.
Figure 7B:
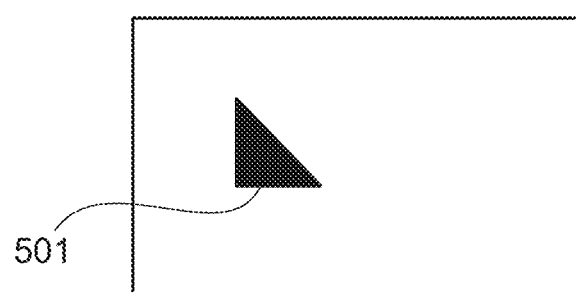

FIGS. 7A and 7B are diagrams illustrating the adjustment chart 500 according to the present exemplary embodiment. More specifically, FIG. 7A illustrates an entire image of the adjustment chart 500, and FIG. 7B is an enlarged view of an adjustment patch 501 (a top-left adjustment patch) illustrated in FIG. 7A. Adjustment patches 502 to 504 (a top-right adjustment patch, a bottom-left adjustment patch, and a bottom-right adjustment patch) illustrated in FIG. 7A are similar in configuration to the adjustment patch 501.

As illustrated in FIG. 7A, the adjustment chart 500 according to the present exemplary embodiment includes the adjustment patches 501, 502, 503, and 504, a document side determination patch 505, and a grid patch 506. The adjustment patches 501, 502, 503, and 504 are used to detect a displacement amount of the position of the image formed on the recording medium. The document side determination patch 505 is used to determine the front side or back side of the adjustment chart 500. For example, the document side determination patch 505 formed on the back side of the recording medium is an image laterally inverted from the document side determination patch 505 formed on the front side of the recording medium. The grid patch 506 is used to detect a distortion of the image formed on the recording medium.

[Rotation Correction of Image in Second Reading Mode]

Rotation correction of the front-side image and the back-side image in a second reading mode according to the present exemplary embodiment will be described below. The second reading mode is a reading mode for reading the adjustment chart 500.

The recording medium on which the adjustment chart 500 is formed by the image printer 301 is placed on the tray 102 of the document feeder 201 by the user. When the user inputs a reading start instruction through the operation unit 212, the adjustment chart 500 is read by the reader 202 while the recording medium is conveyed by the document feeder 201.

Processing on an image obtained by reading the adjustment chart 500 will be described next. In the present exemplary embodiment, the following configuration is applied, whereby the output of a coarse image from the image reader 200 is prevented while an increase in capacity of the memory storing the image data is suppressed.

In a case where the angle θ1 calculated by the document information determination unit 207 is less than a first predetermined amount (e.g., 0.5 degrees), the correction unit 208 reads out and outputs an image of a predetermined area from the image memory 205 without performing the rotation correction. The predetermined area is, for example, a rectangular area including the document image. More specifically, for example, a length of the predetermined area in the main scanning direction is a length from a position shifted left by 2 mm from the left edge of the document image in the main scanning direction to a position shifted right by 2 mm from the right edge of the document image in the main scanning direction. For example, a length of the predetermined area in the sub-scanning direction is a length from a position shifted up by 2 mm from the top edge of the document image in the sub-scanning direction to a position shifted down by 2 mm from the bottom edge of the document image in the sub-scanning direction. The length of 2 mm is set as a length to prevent an edge portion of the document 101 from protruding from the predetermined area even if the document is skewed by the first predetermined amount.

The predetermined area may correspond to, for example, the smallest among standard rectangular sizes including the document image. Alternatively, the predetermined area may correspond to, for example, a size smaller than the smallest among the standard rectangular sizes including the document image.

In a case where the angle θ1 calculated by the document information determination unit 207 is greater than or equal to the first predetermined amount and is less than a second predetermined amount (e.g., 2 degrees), the correction unit 208 performs the rotation correction on the document image, and reads out and outputs a resultant document image from the image memory 205.

Figure 8:
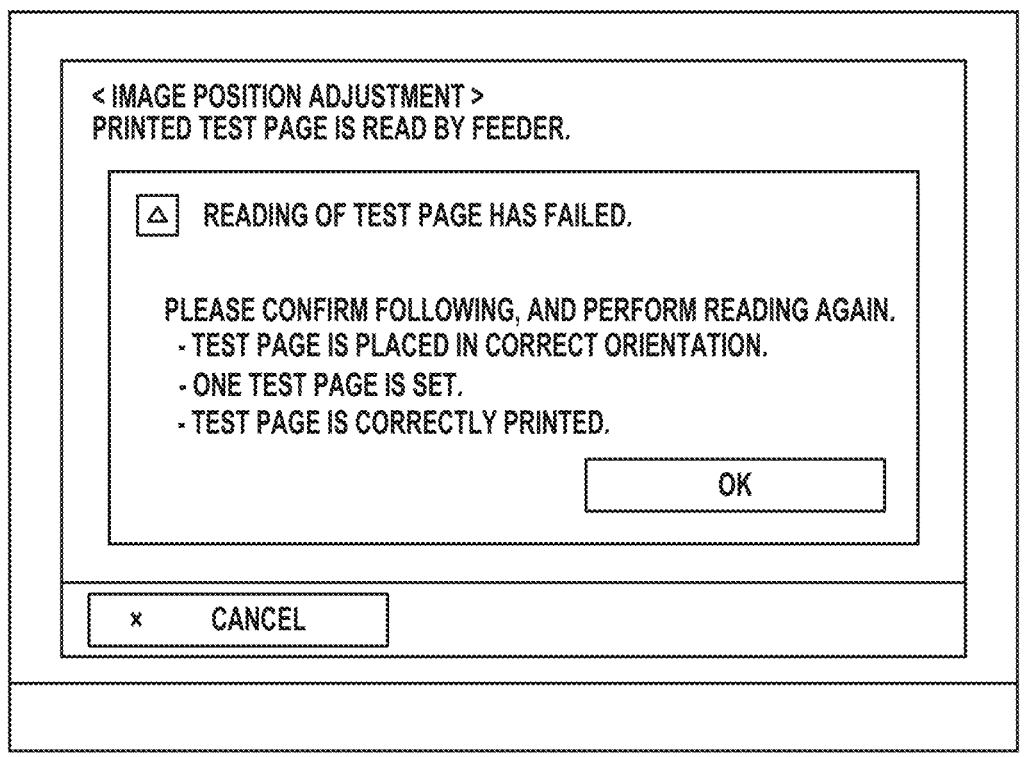
FIG. 8 is a diagram illustrating a notification indicating occurrence of an error in reading a document image according to the exemplary embodiment.

In a case where the angle θ1 calculated by the document information determination unit 207 is greater than or equal to the second predetermined amount, the system controller 151 serving as a notification unit provides a notification indicating occurrence of an error in reading the document image. More specifically, a notification illustrated in FIG. 8 is provided.

The correction unit 208 also performs well-known corrections, such as a squareness correction and a trapezoidal correction, based on the grid patch 506 in addition to performing the rotation correction on the image data to reduce the angle θ1.

The system controller 151 compares the image transmitted from the correction unit 208 with original image data used to print the adjustment chart 500 on the recording medium. More specifically, the system controller 151 calculates a displacement amount of the image transmitted from the correction unit 208, relative to the image of the original image data used to print the adjustment chart 500 on the recording medium. The system controller 151 adjusts the timing for the registration rollers 308 to convey the recording medium to the transfer position, the timing for the optical scanner 311 to form the electrostatic latent image on the surface of the photosensitive drum 309, and the like so as to reduce the displacement amount.

Figure 9:
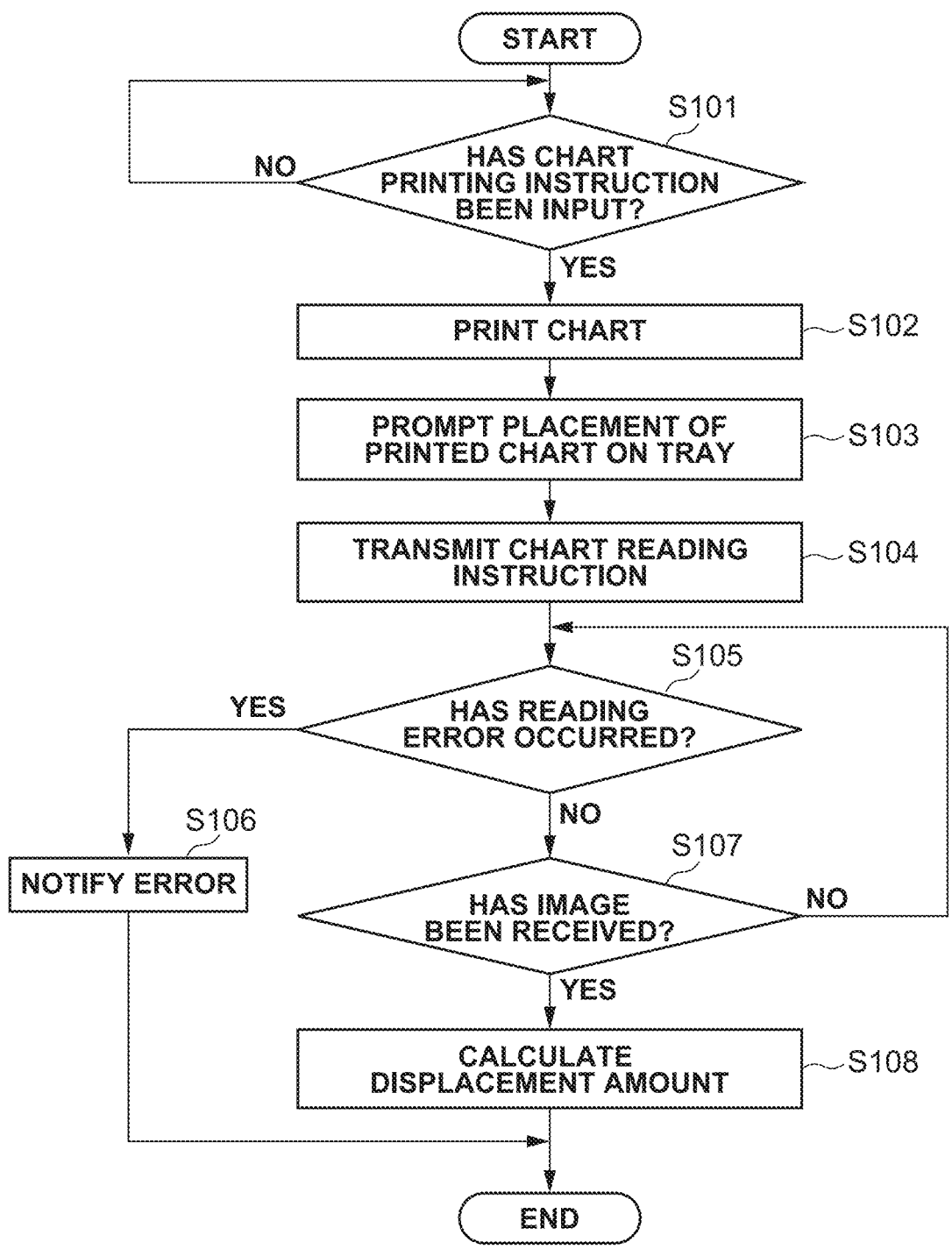
FIG. 9 is a flowchart illustrating processing performed by a system controller according to the exemplary embodiment.

FIG. 9 is a flowchart illustrating processing performed by the system controller 151 according to the present exemplary embodiment.

In step S101, in a case where an adjustment chart printing instruction is input through the operation unit 212 (YES in step S101), the processing proceeds to step S102. In step S102, the system controller 151 controls the image printer 301 to print the adjustment chart 500 on the recording medium.

In step S103, the system controller 151 displays, on the display of the operation unit 212, a notification prompting the placement of the printed adjustment chart 500 on the tray 102 of the document feeder 201.

In step S104, the system controller 151 transmits an adjustment chart reading instruction to the CPU 203.

In step S105, in a case where a notification indicating occurrence of an error in reading the adjustment chart 500 is provided from the CPU 203 (YES in step S105), the processing proceeds to step S106. In step S106, the system controller 151 provides the notification illustrated in FIG. 8.

In a case where a notification indicating occurrence of an error in reading the adjustment chart 500 is not provided from the CPU 203 (NO in step S105), the processing proceeds to step S107.

In step S107, in a case where an image obtained by reading the adjustment chart 500 is transmitted from the CPU 203 (YES in step S107), the processing proceeds to step S108. In step S108, the system controller 151 compares the image with the original image data used to print the adjustment chart 500 on the recording medium, thereby calculating the displacement amount. The displacement amount (the adjustment amount) calculated in step S108 is stored in a memory (not illustrated). In a case where an image obtained by reading the adjustment chart 500 is not transmitted from the CPU 203 (NO in step S107), the processing returns to step S105. When image formation is to be performed on the recording medium, the timing for the registration rollers 308 to convey the recording medium to the transfer position, the timing for the optical scanner 311 to form the electrostatic latent image on the surface of the photosensitive drum 309, and the like are adjusted so as to reduce the displacement amount.

Figure 10:
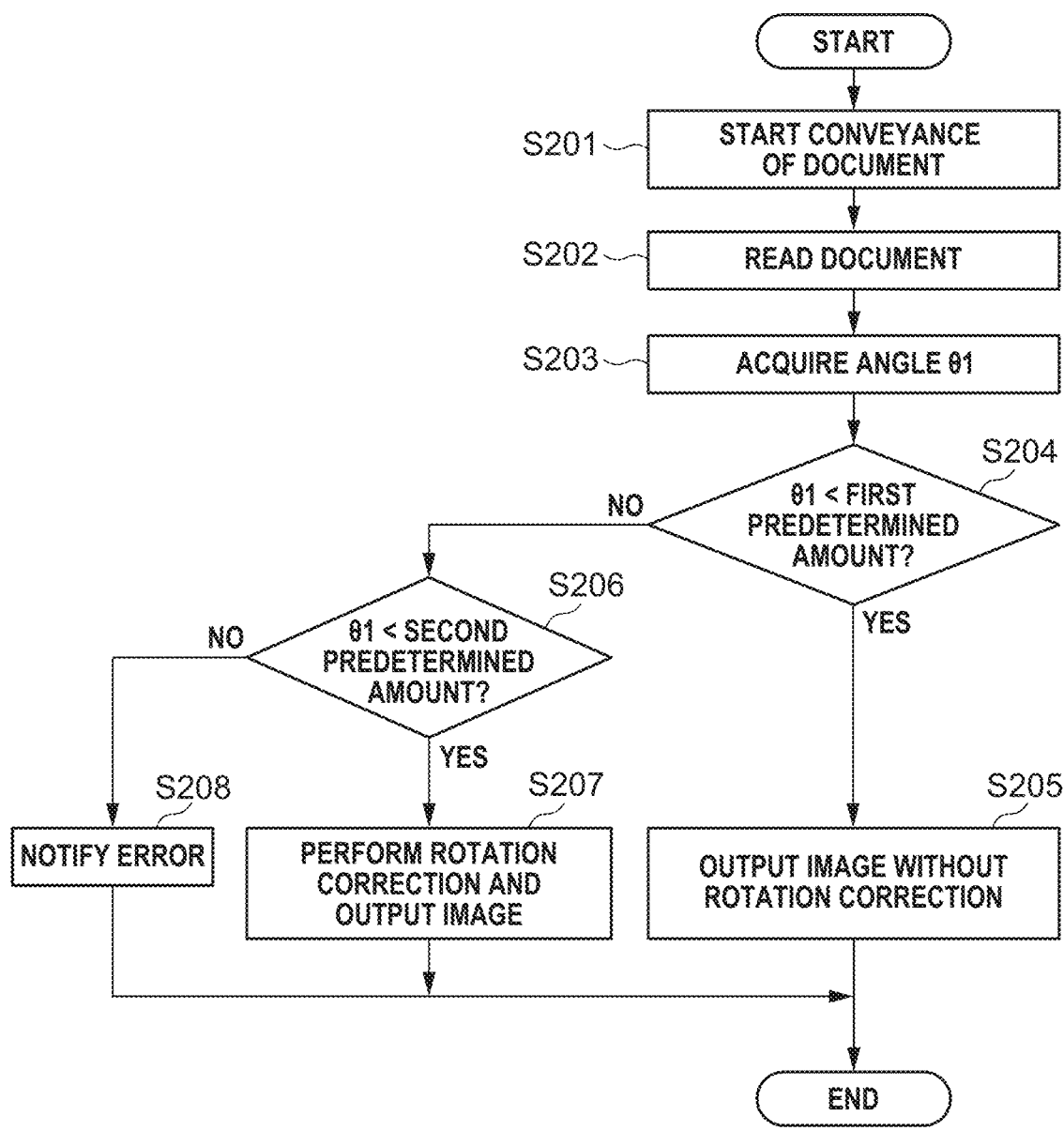
FIG. 10 is a flowchart illustrating processing for reading a chart image according to the exemplary embodiment.
Figure 11:
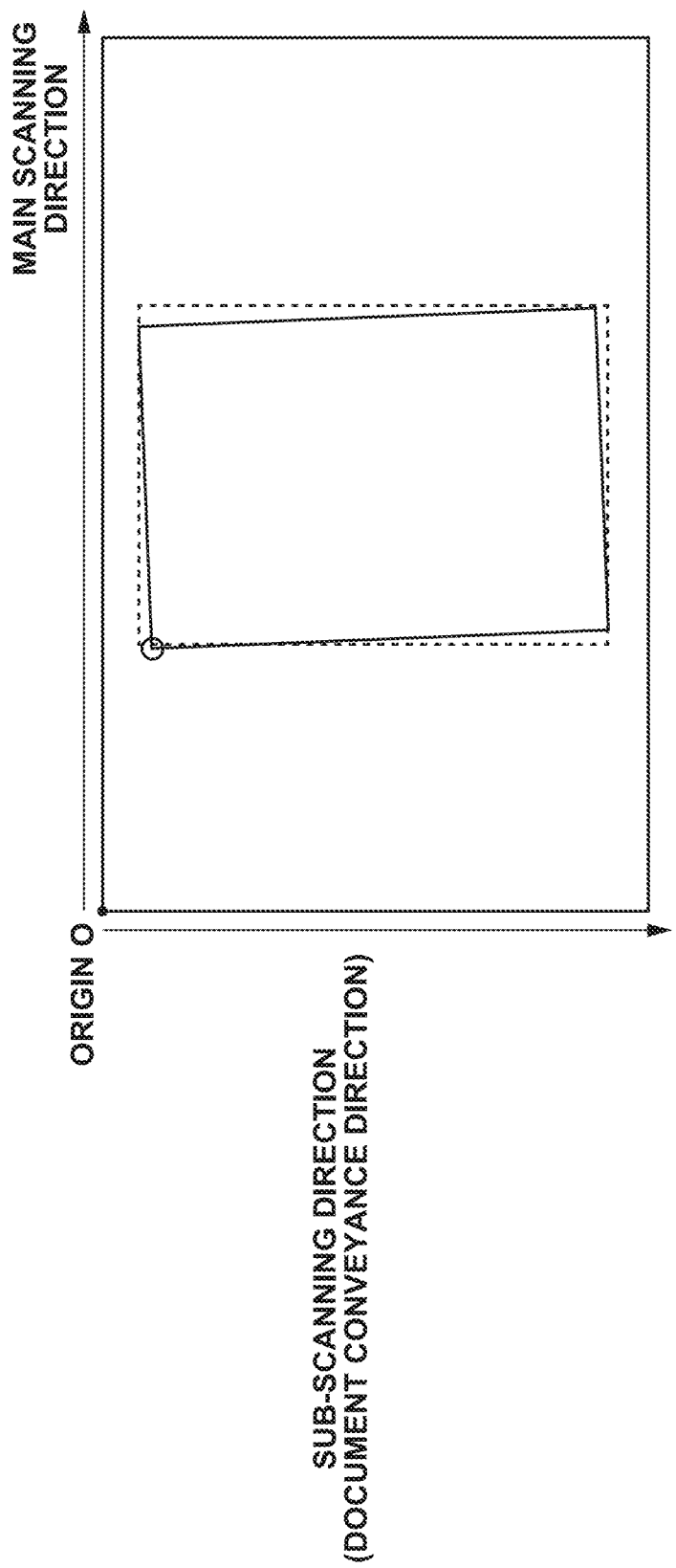
FIG. 11 is a diagram illustrating an image obtained by reading an image of an inclined document.

FIG. 10 is a flowchart illustrating processing for reading the chart image (the adjustment chart 500) according to the present exemplary embodiment. The processing in the flowchart illustrated in FIG. 10 is performed by the CPU 203 when the adjustment chart reading instruction is transmitted to the CPU 203 (in step S104 in FIG. 9).

In step S201, the CPU 203 causes the document feeder 201 to start conveyance of the document 101 placed on the tray 102.

In step S202, the CPU 203 causes the reading units 109A and 109B to read the document image.

In step S203, the CPU 203 acquires information about the angle θ1.

In step S204, in a case where the angle θ1 is less than the first predetermined amount (e.g., 0.5 degrees) (YES in step S204), the processing proceeds to step S205. In step S205, the CPU 203 controls the correction unit 208 to read out and output the image of the predetermined area from the image memory 205 without the rotation correction.

In a case where the angle θ1 is greater than or equal to the first predetermined amount (NO in step S204), the processing proceeds to step S206.

In step S206, in a case where the angle θ1 is less than the second predetermined amount (e.g., 2 degrees) (YES in step S206), the processing proceeds to step S207. In step S207, the CPU 203 controls the correction unit 208 to perform the rotation correction on the document image and to read out and output the resultant document image from the image memory 205.

In a case where the angle θ1 is greater than or equal to the second predetermined amount (NO in step S206), the processing proceeds to step S208. In step S208, the CPU 203 notifies the system controller 151 of occurrence of a reading error.

As described above, in the present exemplary embodiment, in the case where the angle θ1 is less than the first predetermined amount (e.g., 0.5 degrees), the correction unit 208 reads out and outputs the image of the predetermined area from the image memory 205 without the rotation correction. In the case where the angle θ1 is greater than or equal to the first predetermined amount and is less than the second predetermined amount (e.g., 2 degrees), the correction unit 208 performs the rotation correction on the document image and reads out and outputs the resultant document image from the image memory 205. As a result, the output of a coarse image from the image reader 200 is prevented while an increase in capacity of the memory storing the image data is suppressed.

According to the exemplary embodiment of the disclosure, it is possible to prevent reduction of adjustment accuracy of a position of an image to be formed on a sheet while suppressing an increase in capacity of a memory storing image data.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-156132, filed Sep. 29, 2022, which is hereby incorporated by reference herein in its entirety.

What is claimed is:

1. An image forming apparatus comprising:
an image forming circuit configured to form, on a first sheet, a chart image used to adjust a position of an image;
a reader configured to read the chart image on the first sheet while the first sheet is conveyed; and
a controller configured to:
determine, based on an image obtained by the reader reading the chart image, an inclination amount corresponding to an inclination angle of a leading edge of the first sheet in a conveyance direction in which the first sheet is conveyed, relative to a predetermined direction orthogonal to the conveyance direction;
in a case where the inclination amount is greater than a first predetermined amount and is less than a second predetermined amount greater than the first predetermined amount, perform a rotation correction on the image obtained by the reader to reduce the inclination amount, and cut out and store an image of an area of the first sheet in the image subjected to the rotation correction in a memory; and
in a case where the inclination amount is less than the first predetermined amount, cut out and store an image of a predetermined area including the area of the first sheet in the image obtained by the reader, in the memory without performing the rotation correction, the predetermined area having a size smallest among standard sizes including the area of the first sheet,
wherein the image forming circuit forms an image on a second sheet so as to reduce a difference in position between the image stored in the memory and an image used to form the chart image on the first sheet.

2. The image forming apparatus according to claim 1, further comprising a document feeder including a stacking portion configured to stack the first sheet on which the chart image is formed, and a feeding circuit configured to feed the first sheet stacked on the stacking portion, the document feeder being pivotable relative to the reader.

3. The image forming apparatus according to claim 1, further comprising a notification circuit configured to, in a case where the inclination amount is greater than the second predetermined amount, provide a notification indicating occurrence of an error in reading the chart image formed on the first sheet.

* * * * *